United States Patent [19]

Efros

[11] 4,421,334
[45] Dec. 20, 1983

[54] HIGH SPEED CYCLE

[76] Inventor: Boris Efros, 920 N. Stanley Ave., Los Angeles, Calif. 90046

[21] Appl. No.: 321,623

[22] Filed: Nov. 16, 1981

[51] Int. Cl.³ .............................................. B62M 1/04
[52] U.S. Cl. ..................................... 280/236; 74/138; 280/251; 280/255
[58] Field of Search ............... 280/251, 253, 255, 246, 280/236; 74/138

[56] References Cited

FOREIGN PATENT DOCUMENTS

| 31209 | 8/1907 | Austria | 280/236 |
| 912643 | 8/1946 | France | 74/138 |
| 26356 | of 1912 | United Kingdom | 74/138 |
| 200385 | 7/1923 | United Kingdom | 280/236 |

*Primary Examiner*—John A. Pekar
*Assistant Examiner*—D. Lynn Fugate
*Attorney, Agent, or Firm*—Poms, Smith, Lande & Rose

[57] ABSTRACT

A cycle, such as a bicycle, includes reciprocating pedal levers for applying power to the rear wheel through a pair of chains. The pedal lever includes a forwardly extending section for receiving a person's foot and a rearwardly extending portion for receiving a slider which is connected to one end of the chain which applies the power to the sprocket. The rearwardly extending portion of the pedal lever includes notches with perpendicular sides to engage a pawl on the slider. A release member extends longitudinally along the rearward portion of the pedal lever and also includes a series of notches generally co-extensive with those on the pedal lever, but having slanted surfaces, and being spaced differently from the spacing of the notches in the pedal lever, so that only one of the notches on the elongated release member lines up with a corresponding notch on the pedal lever. A pawl on the slider has a control elements or fingers extending into notches both on the pedal lever and also on the release member, so that, when the release member is shifted in position to change gear ratios, the pawl is forced up out of locking engagement with the notch in the pedal lever and moves to a new location, where the two notches are lined up, relative to the pawl. The end of the chain which is not connected to the slider, is held under tension by spring arrangements connected to the forwardly extending portion of the pedal lever, to substantially automatically take up the slack and maintain substantially constant tension in the chain as it moves back and forth delivering power to the sprocket.

12 Claims, 18 Drawing Figures

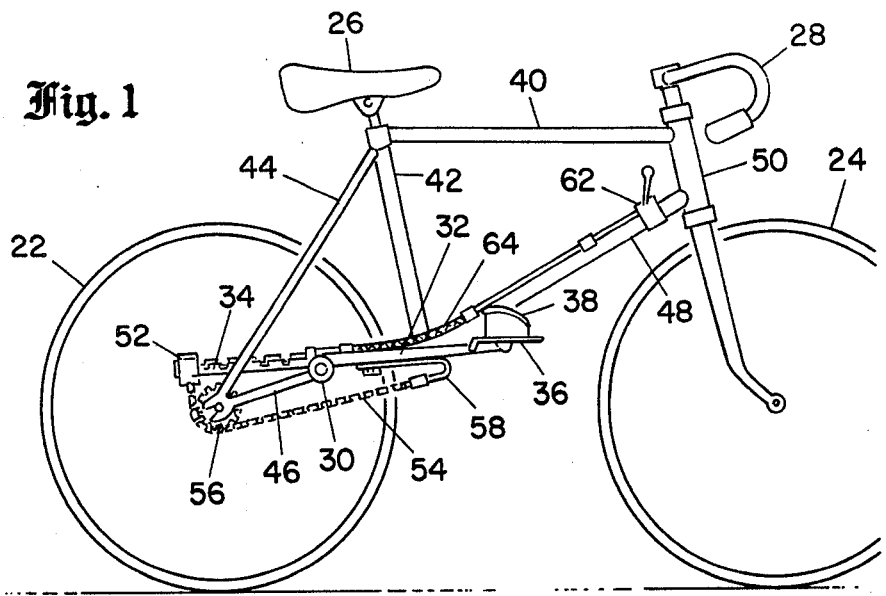
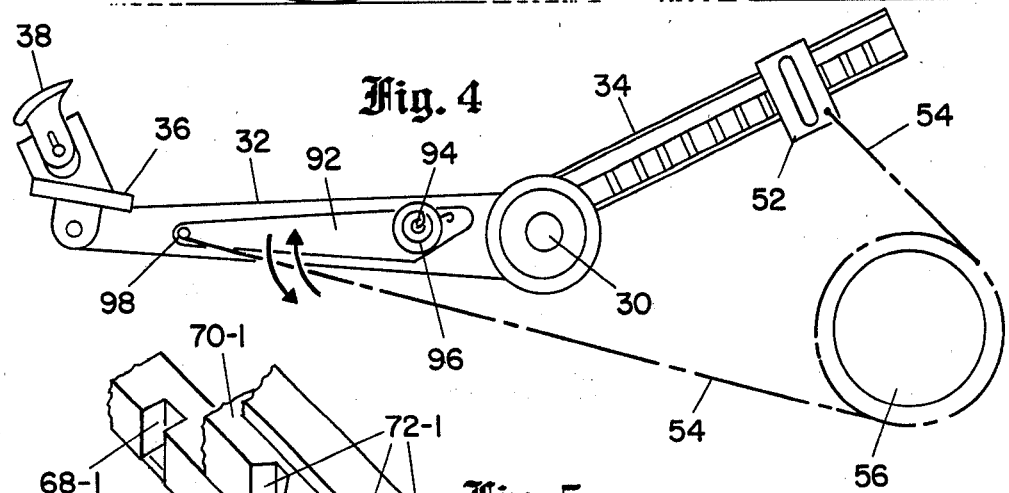
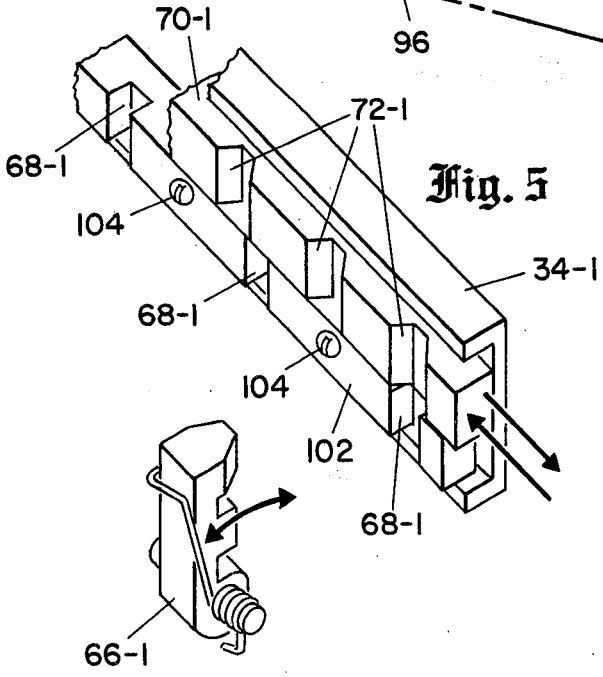

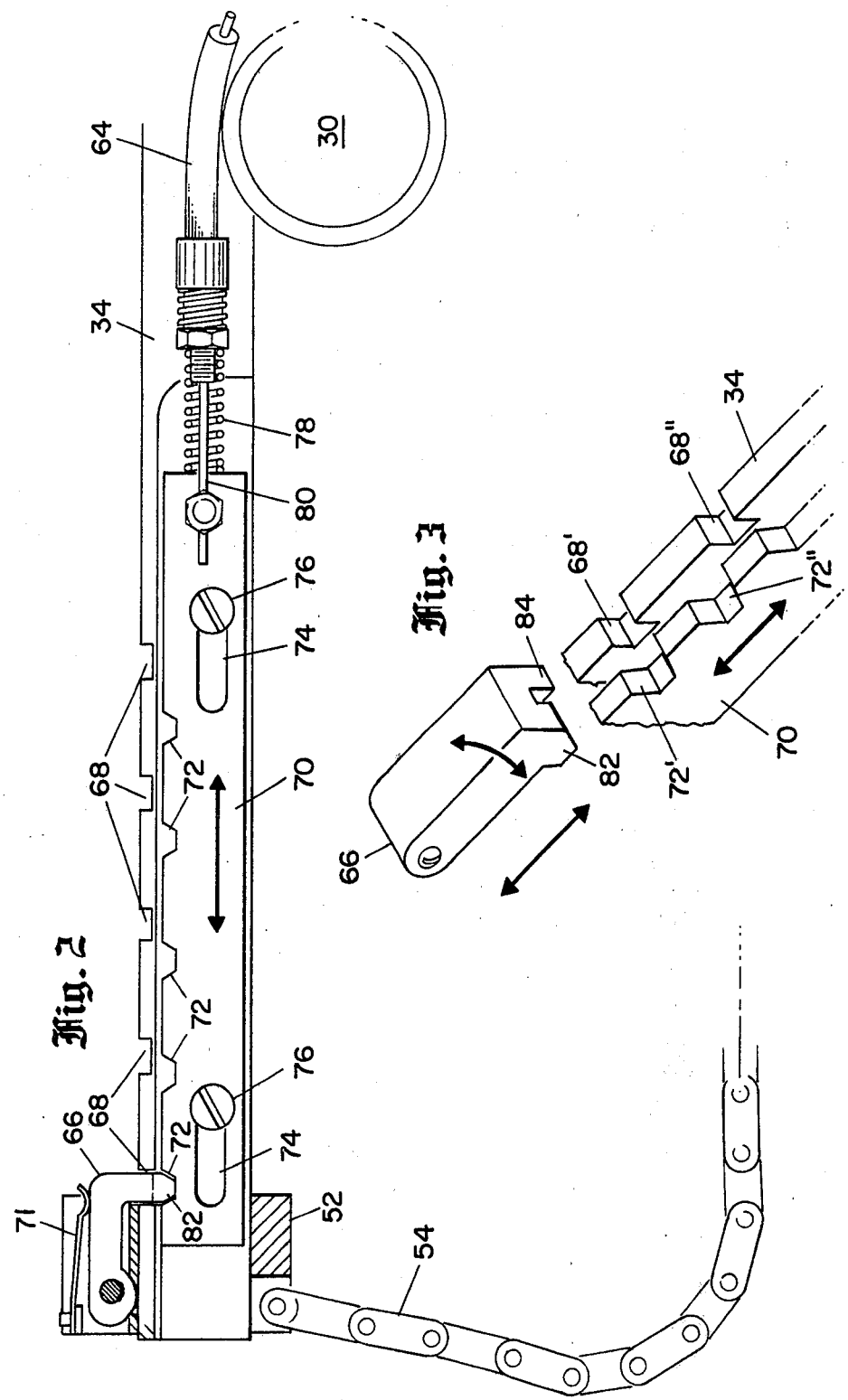

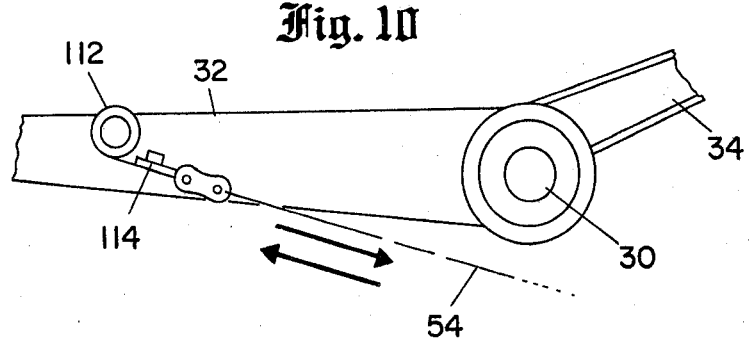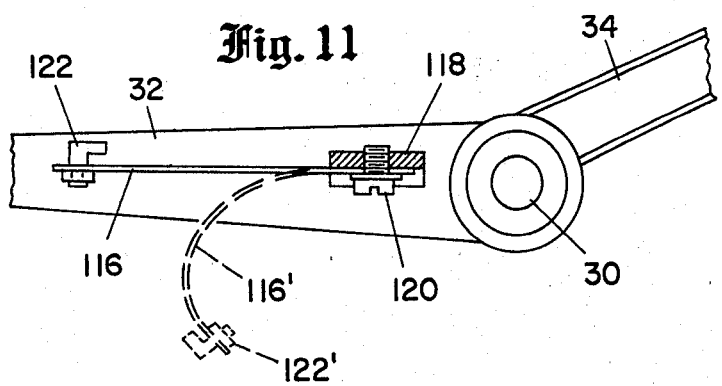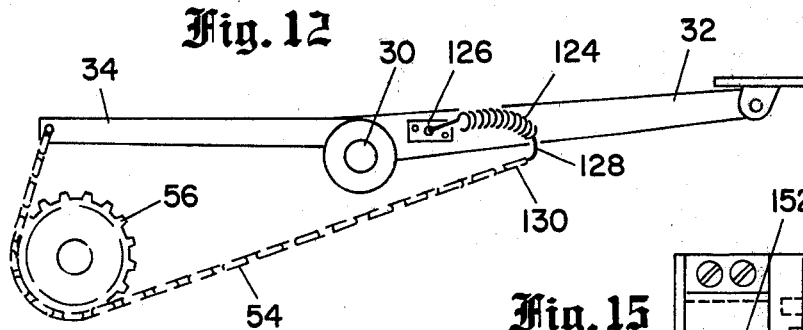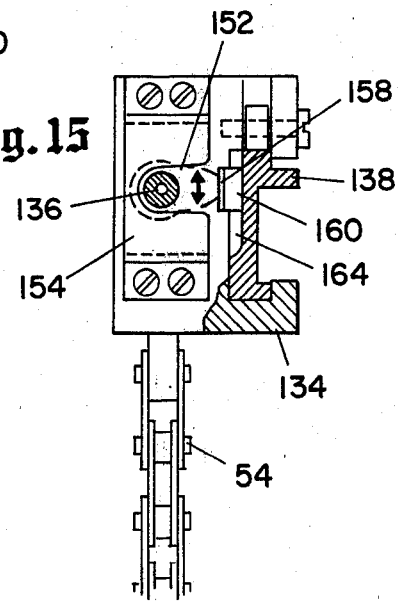

HIGH SPEED CYCLE

FIELD OF THE INVENTION

This invention relates to cycles provided with reciprocating pedal levers for transmitting power to drive the cycle.

RELATED APPLICATIONS

This patent application is related to my prior copending U.S. Patent Application Ser. No. 036,150 filed May 4, 1979, granted Nov. 17, 1981 as U.S. Pat. No. 4,300,784. FIGS. 13 through 17 of this application correspond to figures of the prior case, while FIGS. 1 through 12 of this application are new.

BACKGROUND OF THE INVENTION

Pedal lever bicycles have been proposed heretofore, and arrangements have been suggested for changing the ratio of power applied to the driving chains for the bicycles. However, these gear changing arrangements have often been manually operable, or have not been positive in their mode of locking into the new power or gear ratio. Also, in some cases, the mechanical mechanism has been unduly complex and not readily susceptible of mass production. Accordingly, an important object of the invention is to improve and simplify the gear or ratio changing mechanisms of pedal lever type bicycles.

In pedal lever bicycles, particularly when the pedal levers are to be actuated independently of one another, the problem of maintaining the driving chain under substantially constant tension raises certain problems, because the chain will normally move in the order of 8 to 19 inches. If the chain is connected to a spring which is secured to the frame of the bicycle, therefore, either a constant force spring must be used, or a considerable increase in tension and loss of power is caused when the conventional extension spring is elongated. Further, the use of a constant force spring is subject to some problems, as these springs are not inexpensive, and can come out of adjustment, and have limited fatigue life.

Accordingly, another object of the invention is to improve the arrangements for maintaining the driving chains in a pedal lever bike under proper, substantially constant tension.

SUMMARY OF THE INVENTION

In accordance with one specific illustrative embodiment of the invention, a pedal lever bicycle is provided with a pair of pedal levers each having a forwardly extending portion for receiving a person's foot and a rearwardly extending portion. Slidably mounted on the rearwardly extending portion of each pedal lever is an elongated release member. The rearwardly extending portion of the pedal lever has a series of notches along its length to determine the power ratio of the bicycle, and the elongated release member has a similar series of notches, but differently spaced, and provided with slanted release surfaces for changing the ratio of the bicycle. Power is transmitted from the pedal levers to the sprocket of the cycle by a pair of chains, one connected to each of the rearwardly extending pedal lever members by a slider which is movable on these pedal levers. Each of the sliders has a pawl with fingers extending into the notches on both the pedal lever itself, and also on the elongated release member. Depending on the location of the release member along the length of the rearwardly extending pedal lever, there is one location and only one location of the slider where the fingers of the pawl can extend into both of the two notches, one on the release member and the other on the pedal lever itself. Then, when it is desired to change power ratios, or shift gears, the release member is shifted in position, forcing the pawl out of its fixed engagement, and permitting the slider to move along the length of the pedal lever. Then, when the new location is determined where the fingers of the pawl may extend into two notches, one on each of the cooperating members, the new speed or power ratio is fixed, and firmly locked into its new position.

The release member may be moved along the length of the rearwardly extending portion of the pedal lever by a cable manually operated by the cycle rider, while he is pedalling.

As mentioned above, one end of each of the chains is secured to the sliders mounted on the pedal levers; and the other end of the chain must be tensioned so that the chain will be constrained to engage the sprocket on the rear wheel to transmit power to it. In accordance with a subordinate feature of the invention, a spring may extend from this free end of the chain to a point on the forwardly extending portion of the pedal lever so that the movement of the pedal in coordination with the movement of the chain, will automatically compensate for changes in position of the end of the chain, at least in part, thereby facilitating maintenance of substantially constant tension on the chain as it goes back and forth. In one convenient implementation, a flat spring or a stiff elongated coil spring extends from a mounting point on the pedal lever near the pivot point thereof forwardly along the forwardly extending portion of the pedal lever so that it is deflected downwardly as power is applied to the pedal and the front end of the chain is drawn back toward the sprocket. Alternatively, a supplemental member may be pivotally mounted on the pedal lever and coupled to it by a simple coil spring, and the forward end of the chain may be attached to the forwardly extending point of the supplemental member.

Viewing the speed ratio adjustment features of the present invention from a broader standpoint, the rearwardly extending portions of each pedal lever may be provided with a series of notches for interaction with respective slider assembly for transmitting power to the sprockets of the cycle; and each of the slider assemblies may have arrangements, such as a pawl for engaging the notches, to determine the speed or gear ratio of the cycle, angled surface arrangements are provided between the slider and the rearwardly extending portion of the pedal lever for disengaging the slider from a fixed position on the pedal lever, and finally, arrangements are provided for firmly locking the slider into a fixed position along the length of the pedal lever. In addition, remote unlocking arrangements are provided for releasing the locking means, for selecting a new position of the slider, and for locking the slider into its new position.

It should also be noted that the slider may be either positively moved by a cable or the like, or may be moved by the force of the chain on the slider, after the slider is unlocked from the pedal lever, by a resolution of the forces, as the pedal is operated.

Other objects, features and advantages of the invention will become apparent from a consideration of the following detailed description and from the accompanying drawings.

BRIEF DESCRIPTION OF THE DRAWINGS

FIG. 1 is an overall view of a bicycle illustrating the principles of the present invention;

FIG. 2 shows the rearwardly extending portion of a pedal lever, the elongated release member, and the slider for varying the speed ratio of the cycle;

FIG. 3 is an isometric view of a pawl on the slider and how it interfits with the notches on the pedal lever and the release member;

FIG. 4 illustrates the pedal lever and chain assembly, including the arrangements for applying constant tension to the chain;

FIG. 5 shows an alternative notch arrangement for varying the position of the slider along the length of the pedal lever;

FIGS. 10, 11, and 12 show alternative arrangements for applying tension to the free end of the chain;

FIG. 15 is a partial cross-sectional view taken along lines XV—XV of FIG. 14;

DETAILED DESCRIPTION

Figure 6:
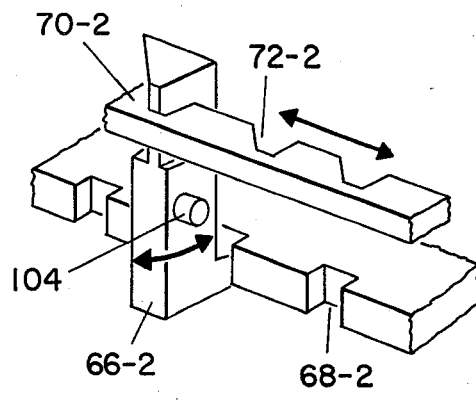
FIGS. 6 through 9 represent alternative arrangements for adjusting the position of the slider on the pedal lever.

Referring more particularly to the drawings, FIG. 1 is an overall view of a cycle embodying the principles of the present invention and including a pair of wheels 22, 24, a seat 26, handle bars 28, and a pedal lever pivotally mounted on the frame at bearing point and including a forwardly extending member 32 and a rearwardly extending member 34. Mounted at the front end of the pedal lever member 32 is a pedal including a lower portion 36 upon which the sole of the shoe bears, and an upper portion 38 which bears on top of the shoe or instep of the rider, and which is employed in raising the pedal lever to its upper position.

The frame of the bicycle includes the frame members 40, 42, 44, 46, 48 and 50, and is somewhat smaller and lighter than that of a conventional bicycle because of the higher location of the bearing 30 for the pedal levers, as compared with the location of the conventional pedal pivot point for conventional bicycles.

A slider 52 is mounted on the rearwardly extending portion 34 of each of the pedal lever. A chain 54 is secured to the pedal lever through the slider 52, and extends over the sprocket 56. Two independent actuable pedal levers, two sliders, and two chains and sprockets are provided (although only one set is shown in FIG. 1), and power is transmitted through separate unidirectional clutches to the rear wheel 22 from the sprockets 56. The front end of the chain 54 is secured to the forwardly extending portion 32 of the pedal lever by a flat leaf spring 58. As the pedal lever 36 is actuated, the rear end of the pedal lever, including slider 52 moves upwardly and the chain also shifts its position. However, with the pedal lever portion 32 moving downwardly, the mechanical arrangement is such as to easily maintain substantially constant pressure on the lower end of the chain 54.

The arrangements for shifting the position of the slider 52 along the length of the rearwardly extending portion 34 of the pedal lever forms an important part of the present invention. This gear or ratio shifting is accomplished, however, by the conventional gear shifting element 62 and cables 64 which are conventionally employed in standard bicycles. By using such conventionally available elements, the cost of the present bicycle is held to a reasonable level.

FIG. 2 shows the rearwardly extending portion 34 of the pedal lever, and its associated structure in greater detail. Specifically, the slider 52 and the chain 54 are shown held in position at the extreme end outer of the pedal lever 34 by the pawl 66 biased into one of the recesses 68 in the pedal lever 34 by a leaf spring 71.

Mounted for slidable movement on the pedal lever portion 34 is an elongated release member 70 which is provided with a series of notches 72 which have front and rear walls which are slanted relative to planes perpendicular to the pedal lever member 34. The release member 70 is provided with slots 74, and it is slidably mounted onto the pedal lever member 34 by the screws or bolts 76. The spring 78 normally biases the release member of plate 70 to its maximum rearwardly extending position as shown in FIG. 2 where the two slots 68' and 72' (see FIG. 3) are lined up. In this regard, note that the adjacent slots 68" and 72" are not aligned. However, when the longitudinally movable shaft 80 within cable 64 is retracted, thereby moving release member 70 to the right, the pawl 66, with its depending fingers 82 and 84 (see FIG. 3) is raised by the pressure of the slanted surfaces on notch 72' on the correspondingly slanted surfaces on the finger 82. The finger 84 is therefore raised out of engagement with the recess 68' and the slider 52 is no longer held in a fixed position along the member 34. Assuming that the gear shift mechanism 62 has been actuated only enough to line up the notches 72" and 68" (see FIG. 3), then, on the next power stroke of the pedal, as the member 34 tilts upward and forward, the chain 54 will exert a forwardly directed force on the slider 52 toward the bearing 30, and pawl 66 will slide along members 34 and 70 until the fingers 82 and 84 drop into the recesses 72" and 68" on the release member 70 and the pedal lever member 34, respectively. This would complete a gear shifting or ratio changing step. Of course, for climbing steep hills, the slider 52 is shifted to the lowest gear ratio where the pawl 66 engages the recesses which are closest to the pivot point 30. Then, when shifting to higher gear, this is accomplished when the pedal lever is in the position shown in FIG. 2, where force applied by the chain 54 will tend to move the slider outwardly away from the bearing 30.

FIG. 4 shows an arrangement for applying a biasing force to the free end of the chain 54. Incidentally, it should be particularly noted that the orientation of FIG. 4 is reversed as compared with that of FIG. 1, with the pedal lever portion 32 carrying the pedal extending to the left, and the rearwardly extending portion 34 extending to the right. As mentioned above, one end of the chain 54 is secured to the slider 52. In FIG. 1 the leaf spring 58 was employed to apply tension to the other end of the chain 54. In the arrangement of FIG. 4, a supplemental chain tensioning element 92 is mounted at pivot point 94 on the forwardly extending portion 32 of the pedal lever. In addition, a clock type spring 96 is employed to bias the member 92 in the clockwise direction relative to member 32. Accordingly, the arm 92 together with the coil spring 96 applies substantially constant tension to the chain 54 as the pedal lever is actuated, with the securing point between the member 92 and chain 54 being the point 98.

In the arrangement of FIG. 2, one preferred form of controlling the position of the slider 52 was shown. We will now consider certain other arrangements for accomplishing much the same thing in different ways. In FIG. 5 the channel shaped rearwardly extending pedal lever member 34-1 includes a first longitudinally extending member 102 rigidly fixed thereto by the screws or bolts 104. This member 102 has transverse slots 68-1 in its side surface. Movably mounted in the member 34-1 is the longitudinally extending release member 70-1. The pawl 66-1 is secured on the slider 52 to perform the same functions relative to the slots 68-1 and 72-1 as were accomplished by the slider 66 with regard to the slots 68 and 72 in the arrangements of FIGS. 2 and 3.

In FIG. 6 a similar result is achieved relative to the slots 68-2 and 72-2 by the pivoted pawl member 66-2. The pivot point for the pawl 66-2 is shown schematically at reference numeral 104 in this figure of the drawings.

Figure 7:
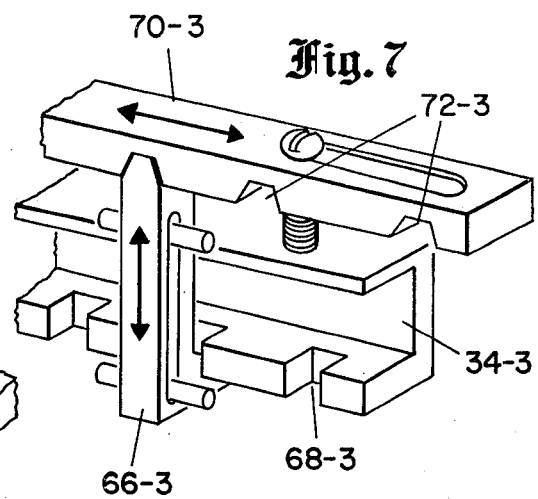
Figure 8:
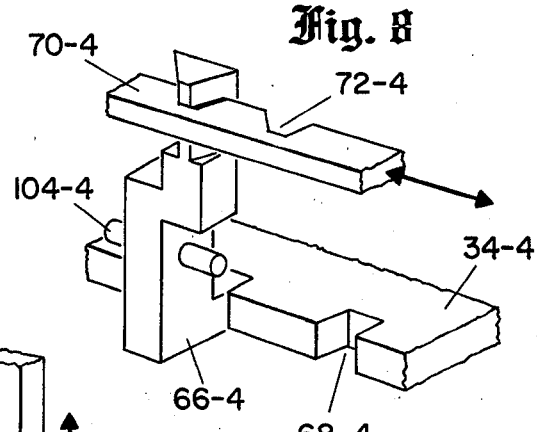
Figure 9:
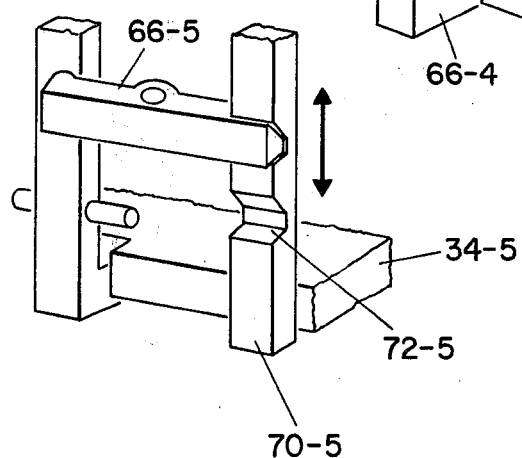

In FIG. 7, the control member 66-3 is shown moving vertically to engage the slant walled recesses 72-3 in the release member 70-3. FIGS. 8 and 9 show various alternative arrangements, in all of which the same functions are achieved with somewhat different mechanical arrangements. In these FIGS. 8 and 9 similar reference numerals have been employed to those used in describing the previous figures, so that the mode of operation is evident to those skilled in the art.

Referring to FIGS. 10, 11 and 12, these figures of the drawings show alternative arrangements for maintaining the chain under tension as the bike is pedalled, and the chain necessarily goes back and forth over the sprocket to drive the rear wheel. In considering FIGS. 10, 11 and 12, it is important to note the reference numerals 32 and 34 which refer to the forwardly extending portion of the pedal lever and to the rearwardly extending portion thereof, respectively. Note also that in FIGS. 10 and 11, as in FIG. 4, the forwardly extending portion of the pedal lever is extending to the left in the figures, and in FIG. 12, as in FIG. 1, the forwardly extending portion 32 of the pedal lever is oriented to the right. It may also be noted that the pedal levers may either make a slight angle with respect to one another, or may be substantially aligned, depending on the location of the bearing 30, and the desired location of the cycle power stroke.

Now, in connection with all of the arrangements shown for maintaining the chain under tension, the tensioning arrangements are secured to the forwardly extending portion of the pedal lever 32. In the case of FIG. 10, a constant force spring 112 has its inner end pivotally secured to the pedal lever 32, and the outermost turn of the coil spring is secured at point 114 to one end of the chain 54. In the case of the arrangement shown in FIG. 11, a leaf spring 116 is rigidly mounted to the forwardly extending portion 32 of the pedal lever by the bracket 118 and the screw 120. The hook 122 at the extreme end of the leaf spring 116 engages a matching opening in a securing element at the end of the chain 154, thereby holding it under tension, with the spring 116 flexing as indicated by the dashed lines 116' in the course of operation when the pedal is at the lower end of its power stroke and the end of the chain returns to a point close to the sprocket 56.

In FIG. 12, the coil spring 124 is held with its left-hand end as shown in this figure firmly clamped by the fixture 126 to extend to the right along the forwardly extending portion 32 of the pedal lever as generally indicated in this figure. The free end 128 of the spring 124 is secured to the end 130 of the chain 54, and thereby serves the same function as the springs 112 and 116 of FIGS. 10 and 11.

The remaining FIGS. 13 through 17 of the drawings will now be described in detail. Incidentally, it is noted that these figures are substantially those which were included in my prior co-pending patent application, U.S. Pat. No. 4,300,784 cited hereinabove.

Figure 13:
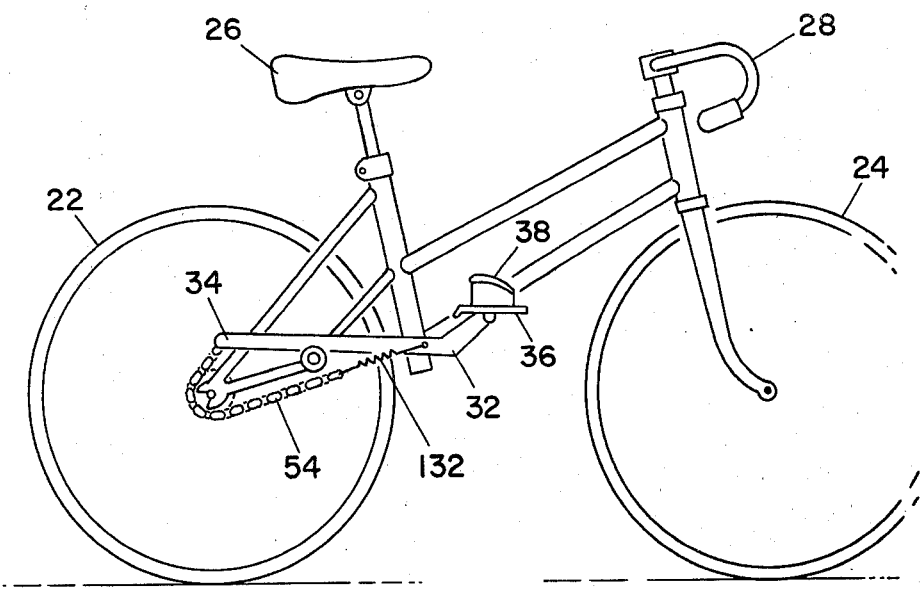
FIG. 13 depicts a bicycle including a simple extension spring connected between the free end of the chain and a forward portion of the pedal lever, for tensioning the chain.
Figure 14:
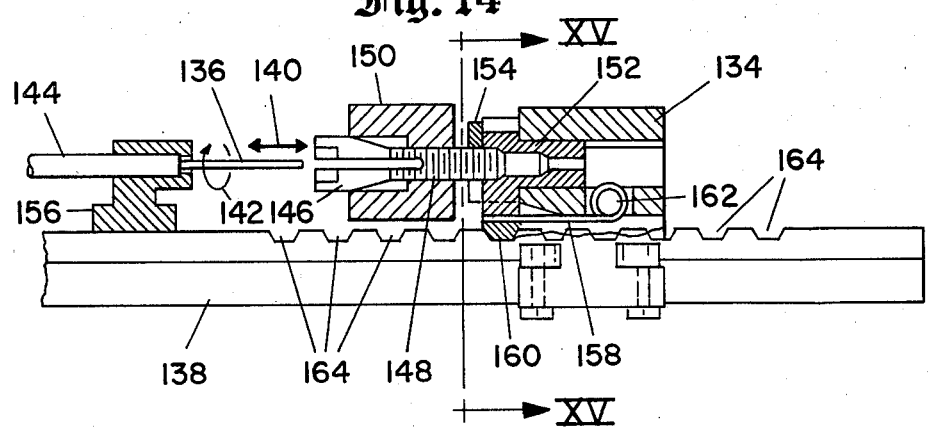
FIG. 14 is a partial cross-sectional view showing another alternative arrangement for shifting the position of the slider along the length of the pedal lever.

With reference to FIG. 13, it is principally of interest in its showing of an extension spring 132 connecting one end of the chain 54 to the forwardly extending portion 32 of the pedal lever. This extension spring 32 maintains the chain under tension; and as in the case of the other embodiments relating to this feature, the fact of mounting the chain to a point on the forwardly extending portion of the pedal lever provides some automatic compensation because the front portion of the pedal lever moves closer to the sprocket during the power stroke, and accordingly, less extension of spring 32 is required than would be the case if the spring were connected to the frame. This is, of course, also true of the other spring interconnections between the forward portion of the pedal lever and the lower end of the chain, as described hereinabove.

FIGS. 14 through 18 of the drawings involve an arrangement in which the slider 134 to which the chain is connected, is operated by a cable 136, with the cable 136 being rotated to unlock the slider from its fixed position on the rearwardly extending portion 138 of the pedal lever, and being moved axially, to shift the slider 134 to different positions along the member 138. These dual movements of the cable 136 are indicated by the arrows 140 and 142. In practice, the central cable element 136 which is mounted to slide within the outer cable member 144, is secured to the slider 134 by the collet 146 at the left-hand end of the threaded member 148, which makes threaded engagement with the collet actuating member 150 and the locking element 152. As the member 150 is tightened up, it engages the slanted surface on the collet 146 and firmly clamps the end of the cable 136 within the central portion of the collet 146. In addition, the threaded member 148 is rigidly fixed to the locking member 152 by any suitable mechanical arrangement, such as a set screw or the like. The bracket 154, which may be seen to advantage in the alternative view of FIG. 15, serves to firmly secure the assembly and the cable 136 to the main body portion of the slider 134.

Incidentally, the outer fixed casing 144 for the cable 136 is firmly secured to the rearwardly extending pedal lever member 138 by any suitable bracket 156.

In operation, when it is desired to change speed ratios, the cable 136 is initially rotated, to turn the locking member 152 out of engagement with the spring 158 and its associated locking detent 160. The spring 158 is mounted at 162, and has the locking detent 160 rigidly secured thereto. When the locking member 152 is in the position shown in FIG. 15 wherein it engages the spring 158 and overlies the locking detent 160, the locking detent 160 is firmly held into one of the recesses 164, and the slider 134 is firmly held in its longitudinal position on the rearwardly extending pedal lever member 138. However, when the cable 136 is rotated, thereby rotating 152 out of engagement with the leaf spring 158, the cable 136 may then be moved longitudinally to shift the position of the slider 134, with the detent 160 moving upwardly out of engagement with the recesses 164 through the flexibility of the leaf spring 158 upon which it is mounted. Then, when the new gear ratio has been selected, cable 136 is rotated back to its original position where the locking member 152 firmly overlies the spring 158 and the locking detent 160, thereby firmly holding the slider 134 in its new position.

The mechanism for rotating the cable 136 and the matching cable 166, and for moving them axially, will now be described in more detail in connection with FIGS. 16, 17 and 18 of the drawings. Incidentally, of course, the mechanism of FIGS. 14 and 15 may involve notches in either the top or the side surface of the rearwardly extending pedal lever portion 138, and in the case of FIGS. 14 and 15, an embodiment has been shown in which the notches are on the side of the pedal lever member 138, and in which the locking member 160 engages these notches from the side. Other equivalent mechanisms for engaging notches in the upper surface of the pedal lever member have been shown and described in my prior co-pending patent application mentioned hereinabove.

Figure 16:
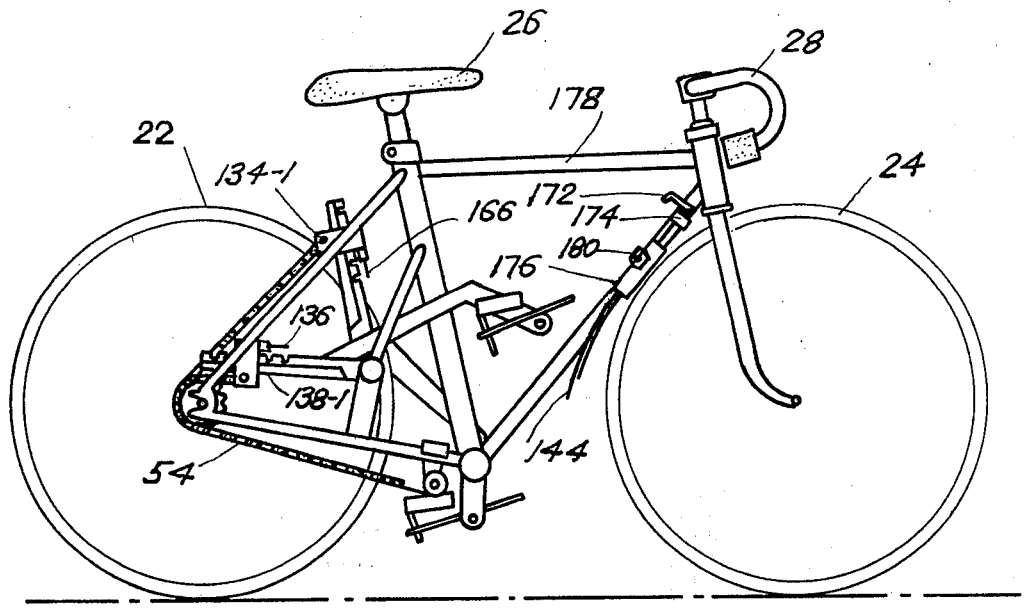
FIG. 16 is an overall view of a bicycle employing an alternative form of ratio shifting arrangements.
Figure 17:
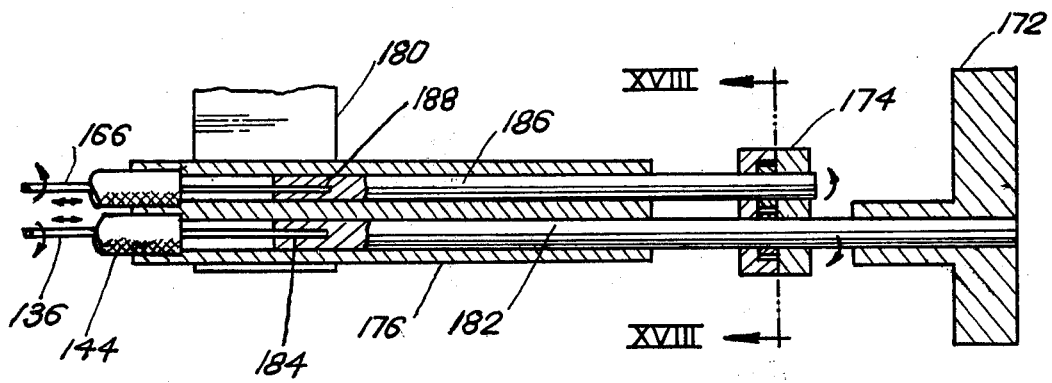
FIG. 17 is an enlarged view partially in cross-section of the manual gear changing arrangements mounted on the frame of the bicycle of FIG. 16 for operation by the rider.
Figure 18:
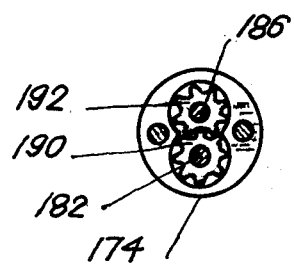
FIG. 18 is a cross-sectional view taken along lines XVIII—XVIII of FIG. 17.

In connection with FIGS. 16, 17 and 18, the arrangements for rotating the cables 136 and 166, and for moving them longitudinally, are of primary interest. As shown in FIG. 16, the handle for operation by the rider is designated by the reference numeral 172, and also shown are a gearing assembly 174 and a housing 176 secured to the frame member 178 by a sheet metal strap or bracket 180. With reference to FIG. 17, the handle 172 is secured to a rigid rod 182 which passes through the gear assembly 174, is slidably mounted within the housing 176, and is firmly or rigidly secured to the cable 136 at point 184. A companion rod 186 is rigidly secured to the cable 166 at point 188. The gears 190 and 192 are secured to the rods 182 and 186, respectively, so that when the rod 182 is turned in one direction by the rotation of the handle 172, the rod 186 is rotated in the opposite direction. In each case, the locking members such as member 152 shown in FIG. 15, are rotated to release the sliders. Then the handle 172 is moved axially, thereby causing the two shafts 186 to slide within the housing 176 and causing the cables 136 and 166 to move longitudinally, thereby shifting gear ratios on the two sliders concurrently. In FIG. 17 an intermediate position of handle 172 is shown.

Summarizing the ratio shifting arrangements as disclosed herein include both locking arrangements for holding the slider firmly in place, and also release arrangements for permitting the slider to be moved along the length of the rearwardly extending portion of the pedal lever. In FIGS. 2 and 3, the notches 68 with their side walls perpendicular to the pedal lever, provide the positive locking action, in combination with detent finger 84; while in FIGS. 14 and 15 the rotatable element 152 provides the positive locking. In FIGS. 2 and 3 the slanted side walls of notches 72 facilitate moving the slider; while the slanted side walls of notches 164 in FIG. 14 serve the same function of facilitating movement of the slider in that embodiment. While other arrangements for shifting sliders on pedal lever bikes have been proposed, (1) positive locking (2) remote release and (3) selection of a single new power ratio from a remote locations has not previously been accomplished.

With regard to the chain tensioning springs, it is important that the tension not increase significantly as the pedal is actuates, as such diversion of force from the power stroke is very inefficient. The presently proposed arrangements wherein the chain is coupled by a spring to the front portion of the pedal lever is an effective technique for maintaining substantially constant chain tensioning force and avoiding the waste of energy in the unnecessary stretching or compression of springs. In some bicycle arrangements where the pedal levers are intercoupled, the ends of the chains may also be linked; but the independent actuation of each of the pedal levers as permitted in the present cycles, makes such arrangements inapplicable.

It is to be understood that the foregoing description and the accompanying drawings merely relate to certain illustrative embodiments of the invention. Other arrangements embodying the principles as outlined hereinabove may be readily devised by those skilled in the art. Thus, by way of example, certain alternative arrangements for spring coupling the chain to the forewardly extending pedal lever member to maintain it under tension, were shown, as were certain alternative arrangements for shifting gear ratios. Similar alternative arrangements can be employed for other features of the invention as described herein. By way of example but not of limitation the notches on the release member could have vertical front and back surfaces, while those on the pedal lever could have slanted surfaces, instead of the reverse arrangement as shown in FIGS. 2 and 5. Accordingly, the present invention is not limited to that precisely as shown and described hereinabove.

What is claimed is:

1. A simplified pedal lever type cycle including positive power ratio changing and locking arrangements comprising:

a cycle including at least two wheels, one of which is a drive wheel, a seat, and means for steering the cycle, two chain means for applying power to the drive wheel, a pair of pedal levers each having a forwardly extending portion for receiving a person's foot and a rearwardly extending portion;

means for mounting said pedal levers for operation independently of one another, whereby they may be operated alternately, concurrently or singly at the option of the rider;

slider assembly means mounted on the rearwardly extending portion of each of said pedal levers for varying the power ratio of said bicycle, each slider assembly means being connected respectively to one end of one of said chain means, the rearwardly extending portion of each of said pedal levers being provided with a set of notches for interaction with the respective associated slider assembly;

each said slider assembly having means for engaging said notches for determining the ratio for the application of power by said pedal levers to said drive wheel;

means for positively locking said slider onto a fixed position along the length of said rearwardly extending portion of said pedal lever;

angled means between said slider and said rearwardly extending portion of said pedal lever for disengaging said slider from a fixed position on said pedal lever;

means for remotely unlocking said locking means and causing movement of said slider assembly to a new position along the length of the rearwardly extending portion of said pedal lever, for remotely selecting the new position of said slider assembly, and for positively locking said slider assembly into its new position; and means for maintaining each said chain under tension, said means including spring means coupled between the other end of each said chain and the forwardly extending portion of one of said pedal levers.

2. A simplified pedal lever type cycle as defined in claim 1 including an elongated release member slidably mounted on the rearwardly extending portion of each pedal lever, said release member being provided with another set of notches spaced differently from the first mentioned set of notches.

3. A simplified pedal lever type cycle as defined in claim 1 including locking means mounted on said slider for normally preventing movement of said engagement means out of engagement with the notch with which it is in engagement.

4. A simplified pedal lever type cycle including positive power ratio changing and locking arrangements comprising:

a cycle including at least two wheels, one of which is a drive wheel, a seat, and means for steering the cycle, two chain means for applying power to the drive wheel, a pair of pedal levers each having a forwardly extending portion for receiving a person's foot and a rearwardly extending portion;

slider assembly means mounted on the rearwardly extending portion of each of said pedal levers for varying the power ratio of said bicycle, each slider assembly means being connected respectively to one end of one of said chain means, the rearwardly extending portion of each of said pedal levers being provided with a set of notches for interaction with the respective associated slider assembly;

each said slider assembly having means for engaging said notches for determining the ratio for the application of power by said pedal levers to said drive wheel;

means for positively locking said slider onto a fixed position along the length of said rearwardly extending portion of the pedal lever, said positive locking means being physically mounted on said rearwardly extending portion of said pedal lever;

means for disengaging said slider from said fixed position on said pedal lever; and means for remotely unlocking said locking means and causing movement of said slider assembly to a new position along the length of the rearwardly extending portion of said pedal lever, for remotely selecting the new position of said slider assembly, and for positively locking said slider assembly into its new position.

5. A simplified pedal lever type cycle as defined in claim 4 including an elongated release member slidably mounted on the rearwardly extending portion of each pedal lever, said release member being provided with another set of notches spaced differently from the first mentioned set of notches.

6. A simplified pedal lever type cycle as defined in claim 5 wherein the notches included in one of said sets of notches have front and back surfaces which are substantially perpendicular to said rearwardly extending portion of said pedal lever, and wherein the notches in the other of said sets of notches have a more open configuration with the front and back surfaces of each notch being slanted relative to perpendicularity to said pedal lever, and wherein said slider assembly is provided with a pawl or linking member having extension means for concurrently engaging a notch in each of said two sets of notches, whereby relative movement of said release member and said pedal lever member disengages the pawl or linking member from both sets of notches and frees the slider for longitudinal movement on the pedal lever by the resolution of the force applied to the slider by the chain means as the pedal is operated.

7. A simplified pedal lever type cycle as defined in claim 4 including locking means mounted on said slider for normally preventing movement of said engagement means out of engagement with the notch with which it is in engagement.

8. A simplified pedal lever type cycle comprising:

a cycle including at least two wheels, one of which is a drive wheel, a seat, and means for steering the cycle, two chain means for applying power to the drive wheel, a pair of pedal levers each having a forwardly extending portion for receiving a person's foot and a rearwardly extending portion;

means for coupling one end of each said chain means to the rearwardly extending portion of one of said pedal levers;

means for mounting said pedal levers for operation independently of one another, whereby they may be operated alternately, concurrently or singly at the option of the rider;

means for maintaining each said chain means under tension, said means including spring means coupled between the other end of each said chain means and the forwardly extending portion of one of said pedal levers; and said means for maintaining chain tension including spring means having one end mounted on said forwardly extending portion of said pedal lever to extend forwardly along said pedal lever, with the chain means being connected to the other end of said spring means.

9. A simplified pedal lever type cycle as defined in claim 8 wherein said spring is a flat leaf type spring.

10. A simplified pedal lever type cycle as defined in claim 8 wherein said spring is a coil spring.

11. A simplified pedal lever type cycle as defined in claim 8 wherein a linkage member is pivotally mounted on said forwardly extending portion of said pedal lever, wherein said chain means is coupled to the outer end of said linkage member, and a spring is provided to bias said linkage member relative to said pedal lever to maintain said chain means under tension.

12. A simplified pedal lever type cycle comprising:
a cycle including at least two wheels, one of which is a drive wheel, a seat, and means for steering the cycle,
two chain means for applying power to the drive wheel,
a pair of pedal levers each having a forwardly extending portion for receiving a person's foot and a rearwardly extending portion;
means for coupling one end of each said chain means to the rearwardly extending portion of one of said pedal levers;
means for mounting said pedal levers for operation independently of one another, whereby they may be operated alternately, concurrently or singly at the option of the rider;
means for maintaining each said chain means under tension, said means including spring means coupled between the other end of each said chain means and the forwardly extending portion of one of said pedal levers;
slider assembly means mounted on the rearwardly extending portion of each of said pedal levers for varying the power ratio of said bicycle, each slider assembly means being connected respectively to one end of one of said chain means;
the rearwardly extending portion of each of said pedal levers being provided with a set of notches for interaction with the respective associated slider assembly;
each said slider assembly having means for engaging said notches for determining the ratio for the application of power by said pedal levers to said drive wheel;
angled means between said slider and said rearwardly extending portion of said pedal lever for disengaging said slider from a fixed position on said pedal lever;
means for positively locking said slider onto a fixed position along the length of said rearwardly extending portion of said pedal lever; and
means for remotely unlocking said locking means and causing movement of said slider assembly to a new position along the length of the rearwardly extending portion of said pedal lever, for remotely selecting the new position of said slider assembly, and for positively locking said slider assembly into its new position.

* * * * *